GOODWIN & BROWNE.
Harvester Reel.
No. 64,523.
Patented May 7, 1867.
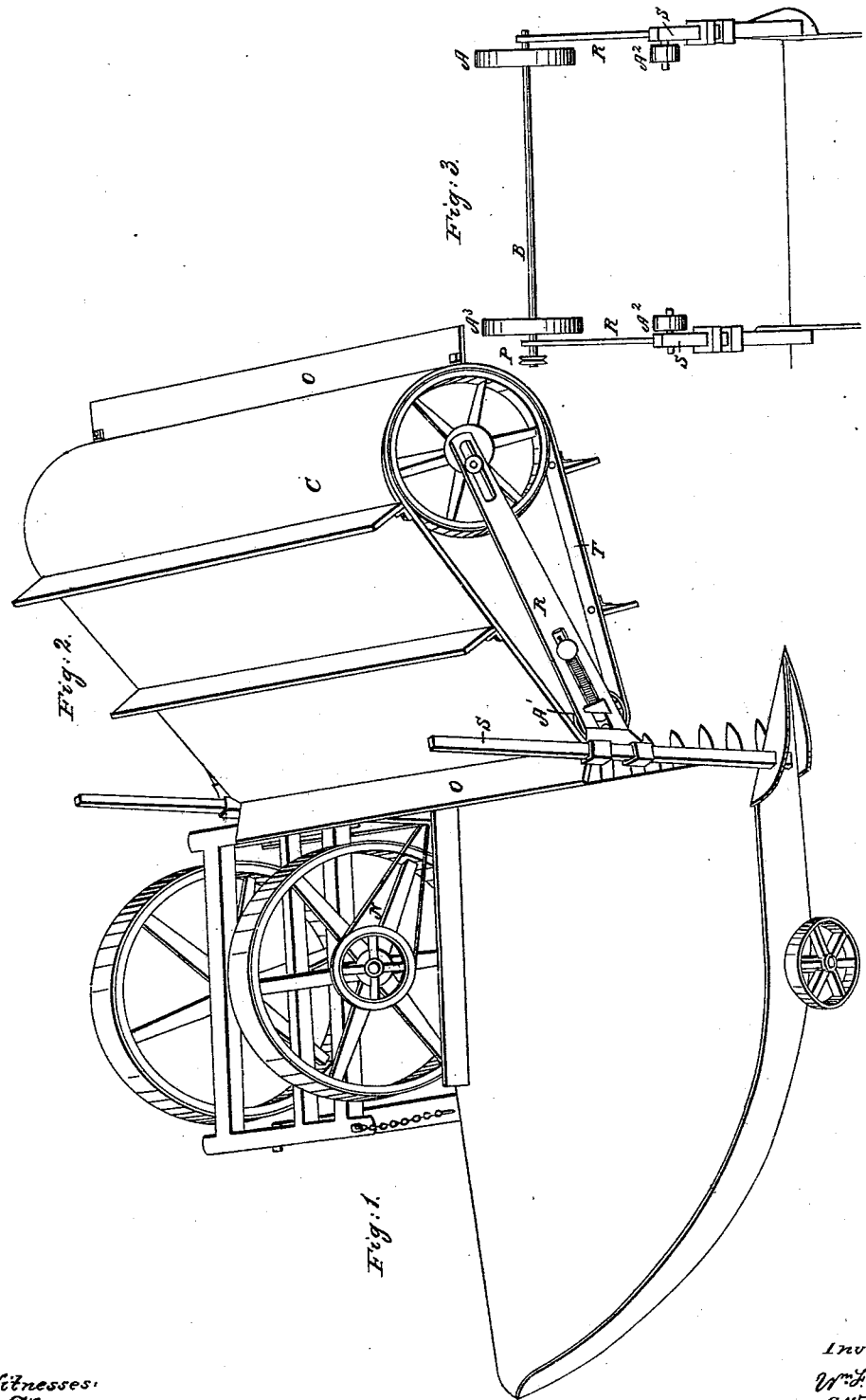

UNITED STATES PATENT OFFICE.

WILLIAM F. GOODWIN, OF WASHINGTON, DISTRICT OF COLUMBIA, AND ARTHUR W. BROWNE, OF BROOKLYN, NEW YORK.

IMPROVEMENT IN HARVESTER-REELS.

Specification forming part of Letters Patent No. 64,523, dated May 7, 1867.

*To all whom it may concern:*

Be it known that we, WILLIAM F. GOODWIN, of the city and county of Washington, and District of Columbia, and A. W. BROWNE, of the city of Brooklyn, Kings county, State of New York, have invented certain new and useful Improvements in Harvester-Reels; and we do hereby declare the following to be a full, clear, and exact description of the nature, construction, and operation of the same, reference being had to the accompanying drawings, which are made part of this specification, and in which—

Figure 1 is a perspective view, looking from the outside of the platform of a harvester having our improved reel attached. Fig. 2 is a perspective view of the reel mounted on the harvester. Fig. 3 is a detached view of the rollers A, A$^1$, A$^2$, and A$^3$, posts S and S', projections R and R', shaft B, and pulley P.

Similar letters of reference indicate corresponding parts in the three figures.

This invention relates to a reel for harvesters constructed with two large and two small rollers, with chains or belts passing over them, and having bars fastened to the chains at equal distances apart and extending across the front of the platform, for the purpose of inclining the grain back over the cutters, so as to cause it to fall on the platform, the same as done by the ordinary reel.

The advantage claimed for this improvement over the ordinary reel is as follows: It reels the grain back over the front of the platform without the bars of the reel passing over the platform, and therefore will not get in the way of a self-rake, as the old ordinary reel would do.

This improvement is especially adapted to harvesters having self-rakes attached, as the bars of the reel do not pass back over the front of the platform, only passing over the cutter-bar, thus allowing the rake to work up close to the front of the platform without coming in contact with the reel.

To enable others skilled in the art to which our invention appertains to fully understand and use the same, we will proceed to describe it in connection with the accompanying drawings.

The posts S and S' are placed on the front corners of the platform in line with the cutter-bar, one on each side, and standing perpendicular to the floor of the platform, and forming supports for the reel. The projections R and R' have boxes on their ends, which are made to fit over and slide up and down on the posts S and S', for the purpose of adapting the reel to different varieties of grain, the reel being elevated and depressed by moving the boxes up and down on the posts. The projections R and R' are made to project forward and upward sufficiently to form supports for the large rollers, A and A$^3$, at the top and the small, A$^1$ and A$^2$, at the bottom. The tops of the projections are provided with slots, into which are fitted journal-boxes, having holes in them for the journals on the end of the shaft B. The large pulleys are fastened onto the shaft B, and are turned by the same.

By moving the journal-boxes up and down in the slots the belts may be tightened or loosened.

The large pulleys, A and A$^3$, are placed one at each end on the shaft B, close to the projections R and R', and at a distance apart equal to the width of the platform. The small rollers, A$^1$ and A$^2$, are placed on studs on the lower ends of the projections R and R', near the posts S and S', one over each corner of the platform, leaving a space between them equal to the width of the platform for the grain to pass through. The belts or chains T are passed over the large and small pulleys, one at each side of the platform. The bars O are fastened at each end of the chains T at right angles with the belts and parallel with the cutter-bar, extending across the front of the platform, and serve to draw the tops of the grain back over the cutters, so that it may fall on the platform.

The top pulleys, A and A$^3$, are made large in diameter for the purpose of carrying the bars O over the tops of the grain, and causing them to descend into the grain the same as the ordinary reel, and also to permit the shaft B to pass clear over the grain while the bars O are descending into it sufficiently to incline it back over the platform.

The diameter of the large pulleys should be equal to the diameter of the driving-wheels of the machine, and the pulley P on the shaft B should be one-third smaller than the main driving-pulley on the axle of the machine. By this arrangement the bars of the reel are caused to move one-third faster than the platform.

This reel can be used with or without a belt of canvas. The small pulleys, $A^1$ and $A^2$, are loose pulleys, and serve to conduct the belts and bars back over the cutters, causing the bars O to pass around the pulleys, thus reeling the grain back over the front of the platform. There is no connecting-shaft between the two small pulleys, the space between them being left open to permit the grain to pass through when the reel is used without canvas.

The reel is driven by the chain N, passing over the pulley P, turning the shaft B, to which are fastened the large pulleys, A and $A^3$. When the shaft is turned forward it turns the large pulleys with it, drawing the chains round the small pulleys, thus operating the reel.

The chains are run by the large pulleys, the small ones only serving as carriers to conduct the bars of the reel back over the cutter-bar.

The arrangement and operation of the reel may be understood by referring to the drawings.

Having thus described our invention, what we claim as new, and desire to secure by Letters Patent, is—

The pulleys A and $A^3$, shaft B, chains T, bars O, and projections R and R', adjustable on the posts S S', combined and arranged to operate with the pulleys $A^1$ and $A^2$ in the manner and for the purpose substantially as described.

WM. F. GOODWIN.
A. W. BROWNE.

Witnesses:
F. A. FOSTER,
JOHN B. McCARTHY.